(12) United States Patent
Baker

(10) Patent No.: US 7,071,965 B2
(45) Date of Patent: Jul. 4, 2006

(54) ARTISTIC COLOR GAMUT DISPLAY

(75) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 531 days.

(21) Appl. No.: 10/428,883

(22) Filed: May 1, 2003

(65) Prior Publication Data

US 2004/0218044 A1 Nov. 4, 2004

(51) Int. Cl.
*H04N 17/02* (2006.01)
(52) U.S. Cl. ........................... 348/186; 348/185
(58) Field of Classification Search ............... 348/186, 348/185, 184, 182, 191, 189, 180, 645, 649; 324/88; 702/66, 67; 345/589, 590, 591; H04N 17/02
See application file for complete search history.

(56) References Cited

U.S. PATENT DOCUMENTS 5,589,877 A * 12/1996 Ikuzawa et al. ............ 348/186
6,560,356 B1 * 5/2003 Takahashi et al. .......... 345/590
6,956,581 B1 * 10/2005 Cui et al. ................... 345/589

* cited by examiner

*Primary Examiner*—Sherrie Hsia
(74) *Attorney, Agent, or Firm*—Francis I. Gray

(57) ABSTRACT

An artistic color gamut display is generated by obtaining maximum and minimum values for an RGB signal. The maximum and minimum values are used as X and Y values for an XY plot. A triangular graticule, or Spearhead display, is generated for the XY plot having a first side representing Lightness, a second side representing saturation and a third side representing Value. The area within the Spearhead display represents valid color gamut. The Spearhead display may be combined with more traditional displays, such as Vector or Arrowhead displays, to provide a completely three-dimensional analysis of the RGB signal in terms of the artistic parameters of Hue, Saturation and Value or Lightness.

13 Claims, 8 Drawing Sheets

SPEARHEAD TRIANGULAR RGB GAMUT SPACE

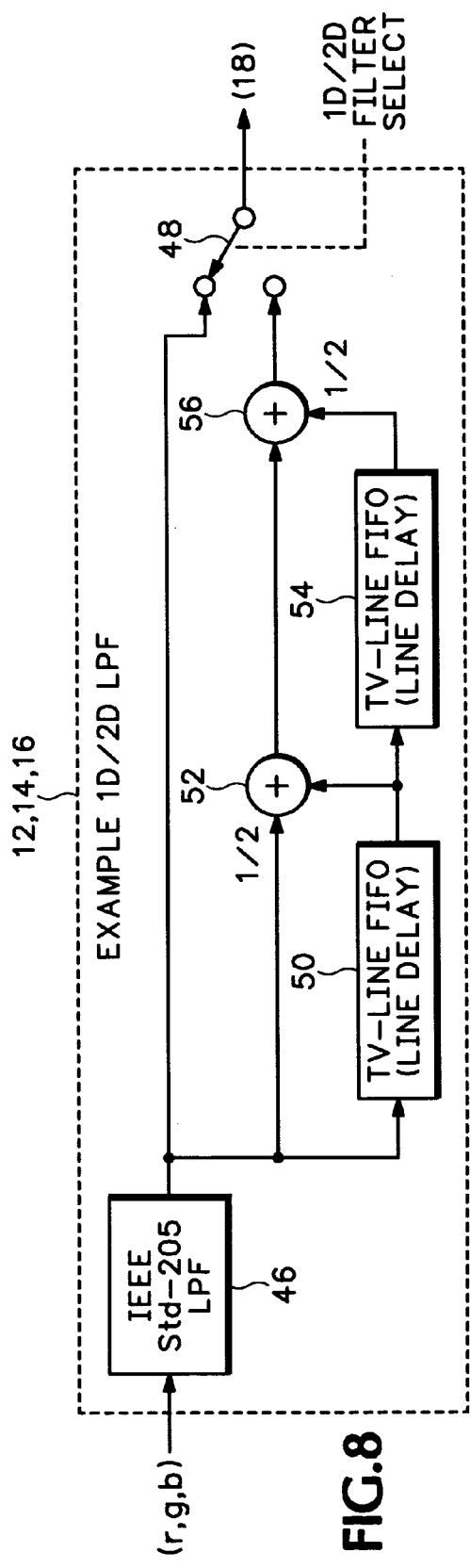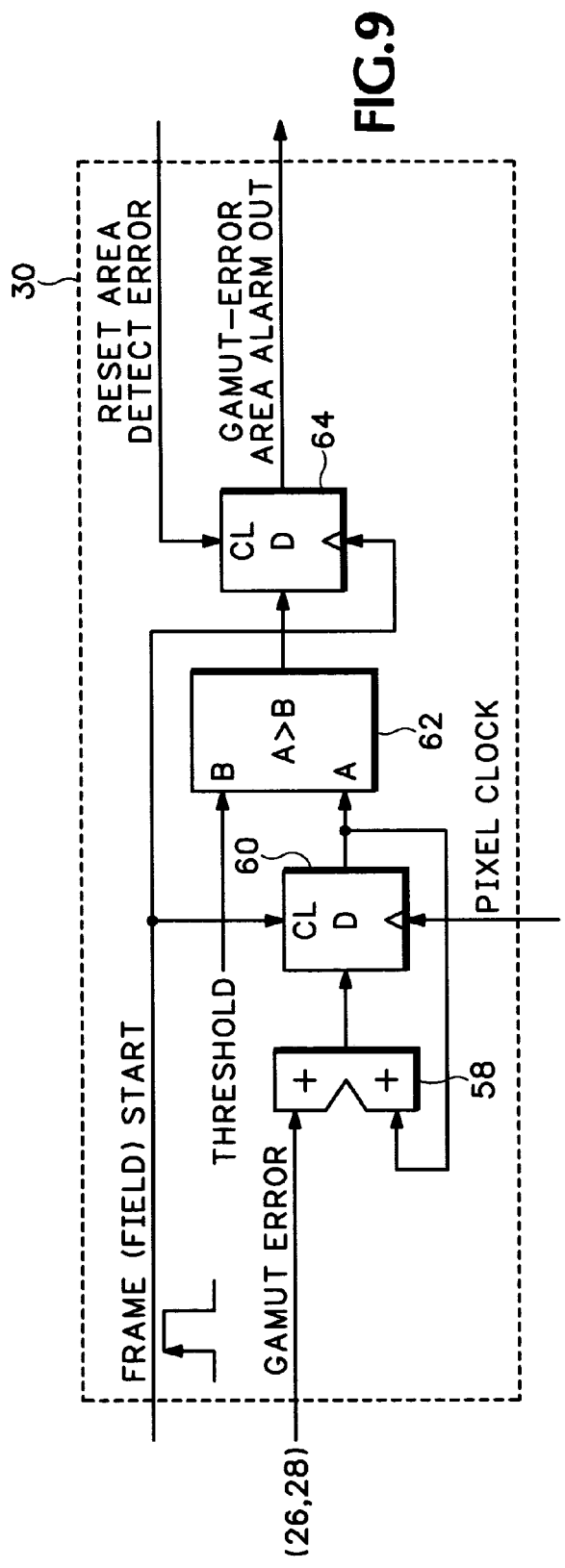

ARTISTIC COLOR GAMUT DISPLAY

BACKGROUND OF THE INVENTION

The present invention relates to the display of video color measurements, and more particularly to an artistic color gamut display that combines the artistic use of color Hue, Saturation, Value and Lightness analysis with the use of a color gamut signal limit space.

With the new and different colorimetry matrix of High Definition TeleVision (HDTV) combined with the interchange of digital and analog component video via different formats, signal level measurement and monitoring related to reproducible color gamut has become more and more necessary. Various color metric displays have been created for video waveform monitors and vectorscopes. These displays, although not standardized, are useful and serve to augment traditional multi-channel waveform displays. Also since composite video, such as NTSC and PAL, is not going away as fast as some people assumed, the need for composite signal limit detection is still growing. In fact the popularity of the Vector (conventional color difference vectorscope), Diamond (U.S. Pat. No. 5,307,087) and Arrowhead (U.S. Pat. No. 5,519,440) displays is still on the rise for video production and conversion from film archives. In addition there has been an increase in sales of black-box gamut limit detectors (U.S. Pat. No. 4,707,727) and correctors or "legalizers."

Combined with color gamut signal limit detection the Vector and Diamond displays have shown some minor utility for artistic use as well. For example, as shown in FIG. 1, the color difference Vector display is often interpreted by color correction artists as a color wheel of hues (angle) and color saturation and/or color value (radius). However the radius is not strictly color saturation or color value, and this has led to confusion. Also the mapping of color hues is not perceptually uniform, giving misleading weight when quantifying color hue errors from the Vector display. Since a valid color gamut requires that there be no negative R, G or B values and that each remain within their predetermined maximum, a valid or legal RGB cubic color space is defined where the RGB signals form the orthogonal basis. The Diamond display is useful for Red, Green, Blue (RGB) gamut or "legal color" detection since it is a projection of this RGB cubic color space, but this is not the color space preferred by artists. Artist prefer the Hue, Saturation, Value (HSV) or Hue, Lightness, Saturation (HLS) color spaces as shown in FIGS. 2 and 3.

What is desired is a new and simple display or display combination that combines the artistic use of color Hue, Saturation and Value or Lightness analysis with the use of a color gamut or "legal" signal limit space.

BRIEF SUMMARY OF THE INVENTION

Accordingly the present invention provides an artistic color gamut display generated by obtaining maximum and minimum values for an RGB signal. The maximum and minimum values are used as X and Y values for an XY plot. A triangular graticule, or Spearhead display, is generated for the XY plot having a first side representing projected Lightness, a second side representing projected Saturation and a third side representing projected Value. The area within the Spearhead display represents valid color gamut. The Spearhead display may be combined with more traditional displays, such as Vector or Arrowhead displays, to provide a completely three-dimensional analysis of the RGB signal in terms of the artistic parameters of Hue, Saturation and Value or Lightness.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 8 is a block diagram view of an example 1D/2D lowpass filter for FIG. 5 according to the present invention.

FIG. 9 is a logic block diagram view of a gamut error area detector for FIG. 5 according to the present invention.

DETAILED DESCRIPTION OF THE INVENTION

Figure 1:
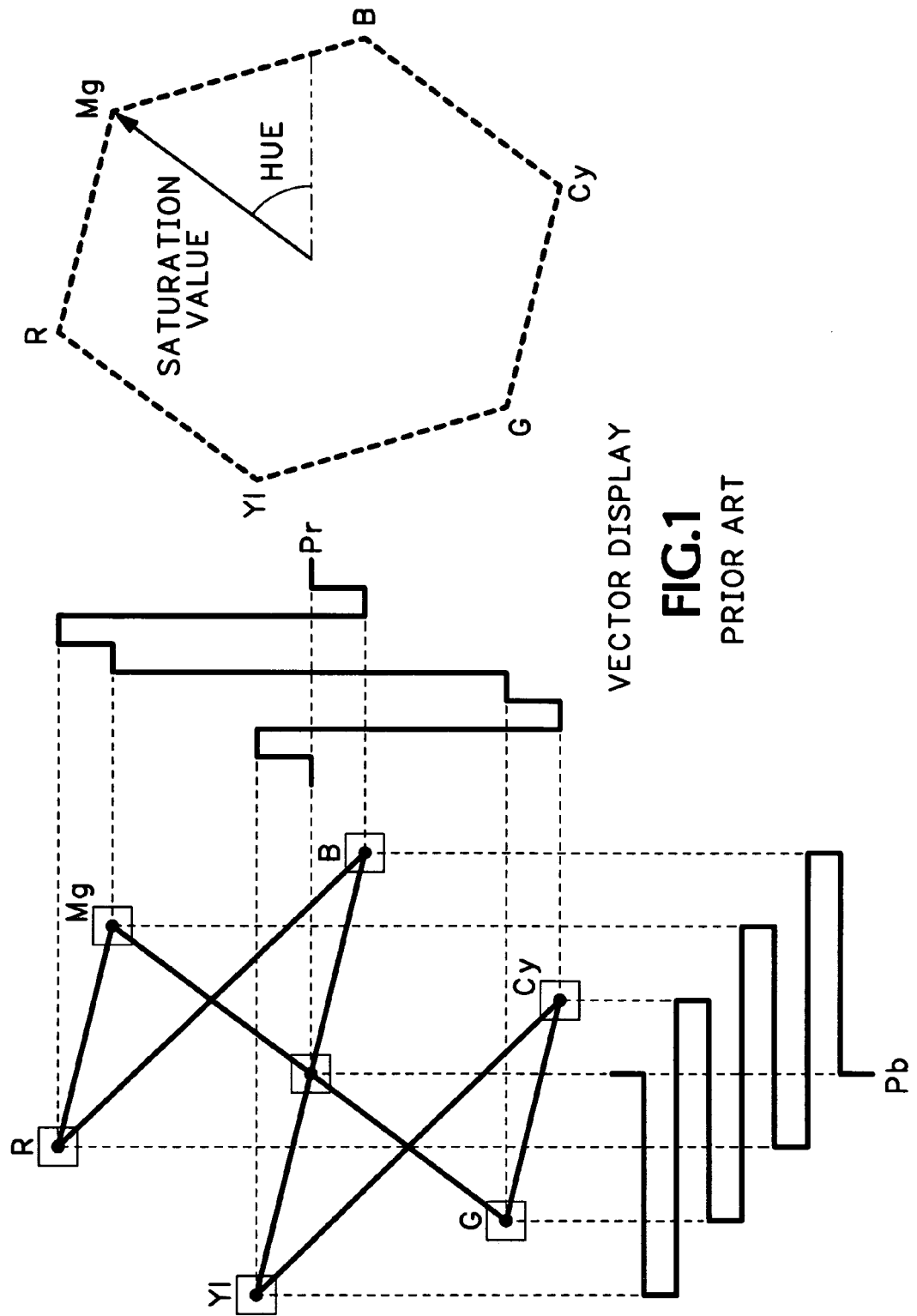
FIG. 1 is a graphical view of a conventional Vector display interpreted in terms of Hue and Saturation.
Figure 3:
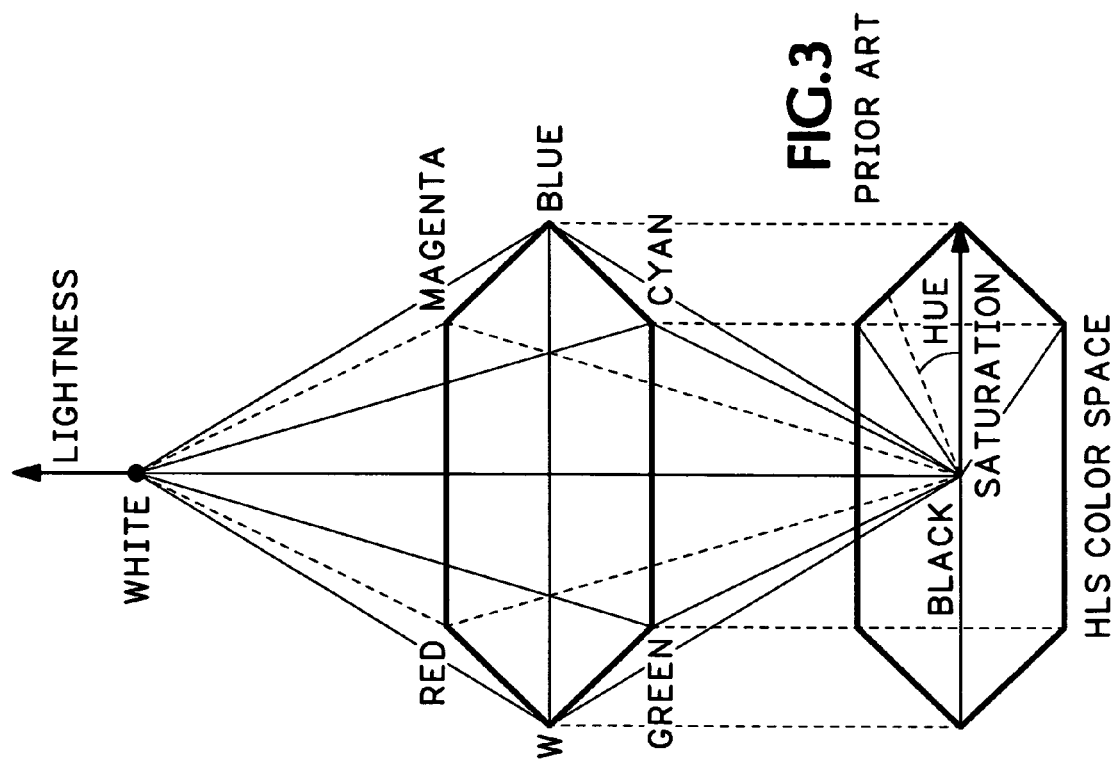
FIG. 3 is a graphical view of HLS color space.
Figure 2:
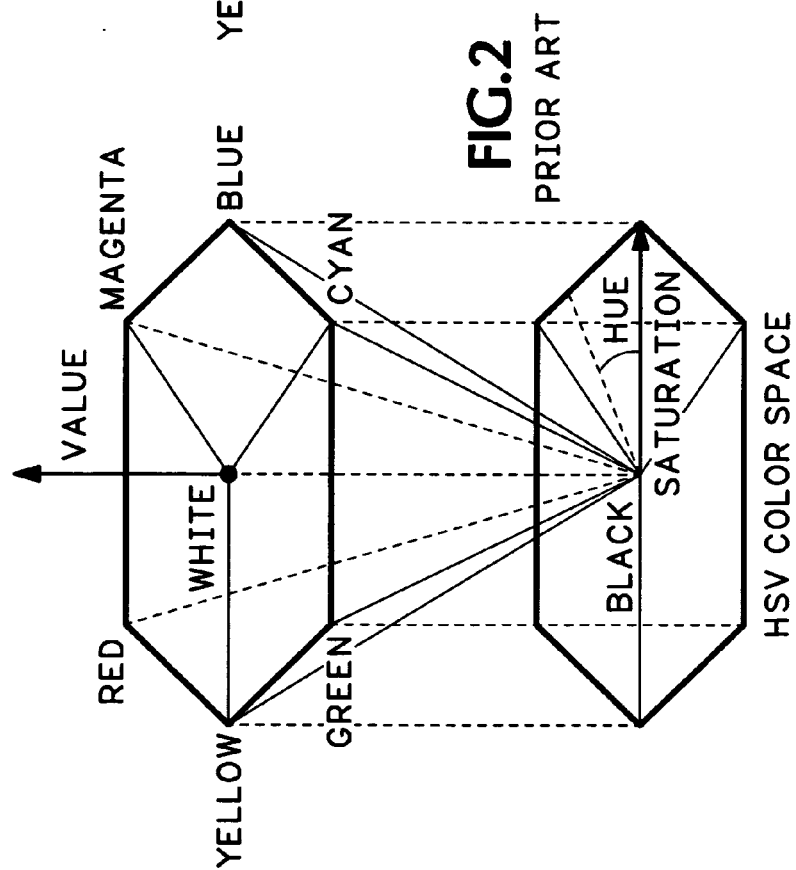
FIG. 2 is a graphical view of HSV color space.
Figure 4:
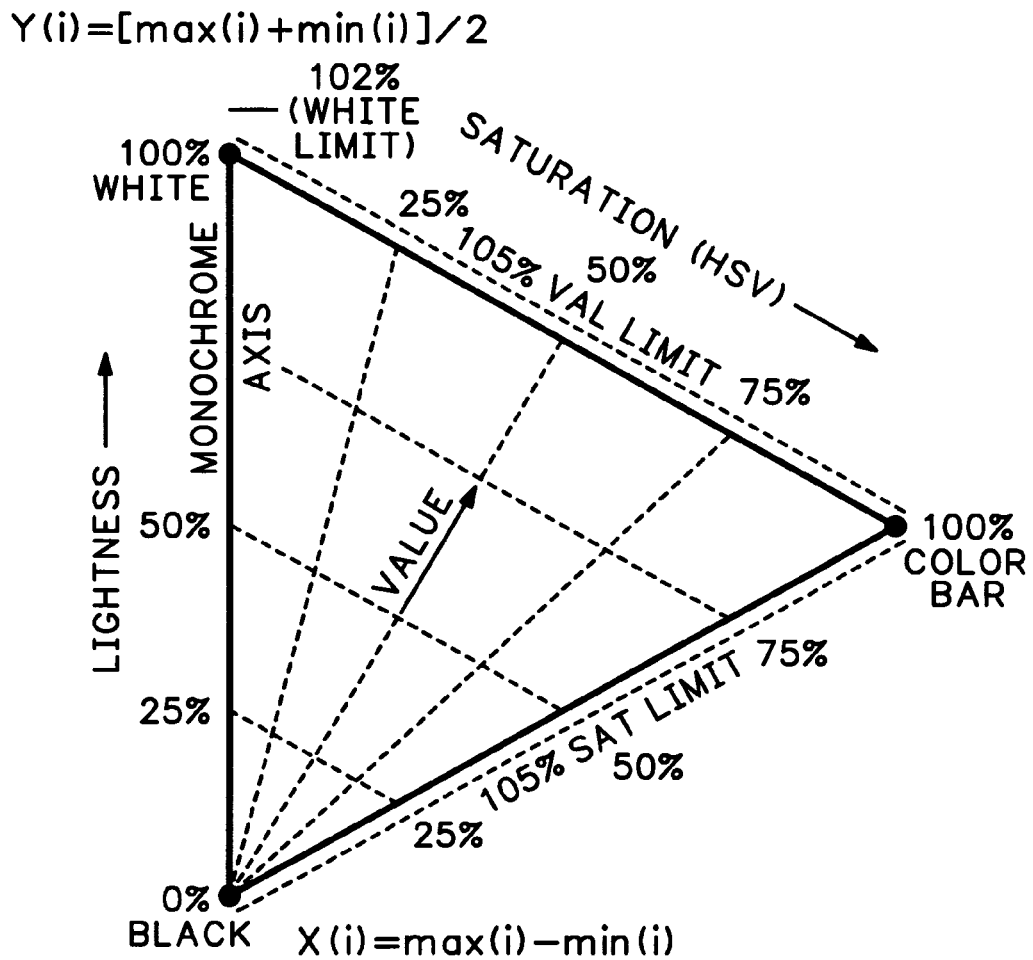
FIG. 4 is a plan view of an artistic color gamut space according to the present invention.

An artistic color gamut display according to the present invention is shown in FIG. 4 and is colloquially referred to as a "Spearhead" display due to the triangular shape of a color gamut limit graticule. The Spearhead display represents a non-linear transformation from RGB color space to a simple two-dimensional (2D) color space that is orthogonal to Hue and contains the artistic metrics of Lightness, Saturation and Value as well as a spatial Gamut area defined by the color gamut limit graticule. This is accomplished by plotting on the vertical axis the Lightness of the HLS space against the Saturation of the HSV space without normalization on the horizontal axis as shown in the following description in conjunction with FIGS. 4–6.

Spearhead Equations

For simplicity assume that the r', g' and b' signals are sampled as discrete-time signals with sample indices indicated by the variable (i) and the (prime) indicating gamma pre-corrected signal samples.

max (i)=maximum value of a triplet 2D filtered r'(i), g'(i), b'(i)

min(i)=minimum value of the triplet 2D filtered r'(i), g'(i), b'(i)

Y(i)=L(i)=½*[max(i)+min(i)]/2

X(i)=max(i)−min(i)

(The ½ scale factor in the equation for Y(i) is only to create a preferred aspect ratio for display. Any scale factor may be applied to either X(i), Y(i) or both to create another preferred aspect ratio.)

The Spearhead display is bounded by a vertical (x=0) line (monochrome) where max(i)=min(i), i.e., Y(i)=max(i)=min (i) and X(i)=0; a (y=x/2) line of all possible one hundred percent (100%) Saturated colors where min(i)=0 and max(i)=0–100%, i.e., Y(i)=max(i)/2, X(i)=max(i); and a (y=−x/2+100%) line of all possible 100% Value colors where max(i)=100% and min(i)=0–100%, i.e., Y(i)=50%+min(i)/2, X(i)=100%−min(i). All valid rgb values (r(i), g(i) or b(i) within the range 0–100%) are contained within the Spearhead triangular gamut space. All invalid or illegal rgb values (min(i)<0 or max(i)>100%) are outside the Spearhead gamut space. Adjustable gamut limit detector thresholds are indicated as graticule markers, i.e., −0.5% and 105%.

Most often the video signal is represented by gamma pre-corrected rgb values, indicated by r', g', b', or as a linear matrix of these values, such as Y', Pb', Pr'. Gamma pre-correction is done to compress the dynamic range and to compensate for the non-linear transfer of typical CRT displays. However, the Spearhead display retains all of the previously mentioned utility when using rgb values that have not been gamma pre-corrected or where the rgb values are derived from a linear matrix of Y, Pb, Pr or Y', Pb', Pr'.

Figure 5:
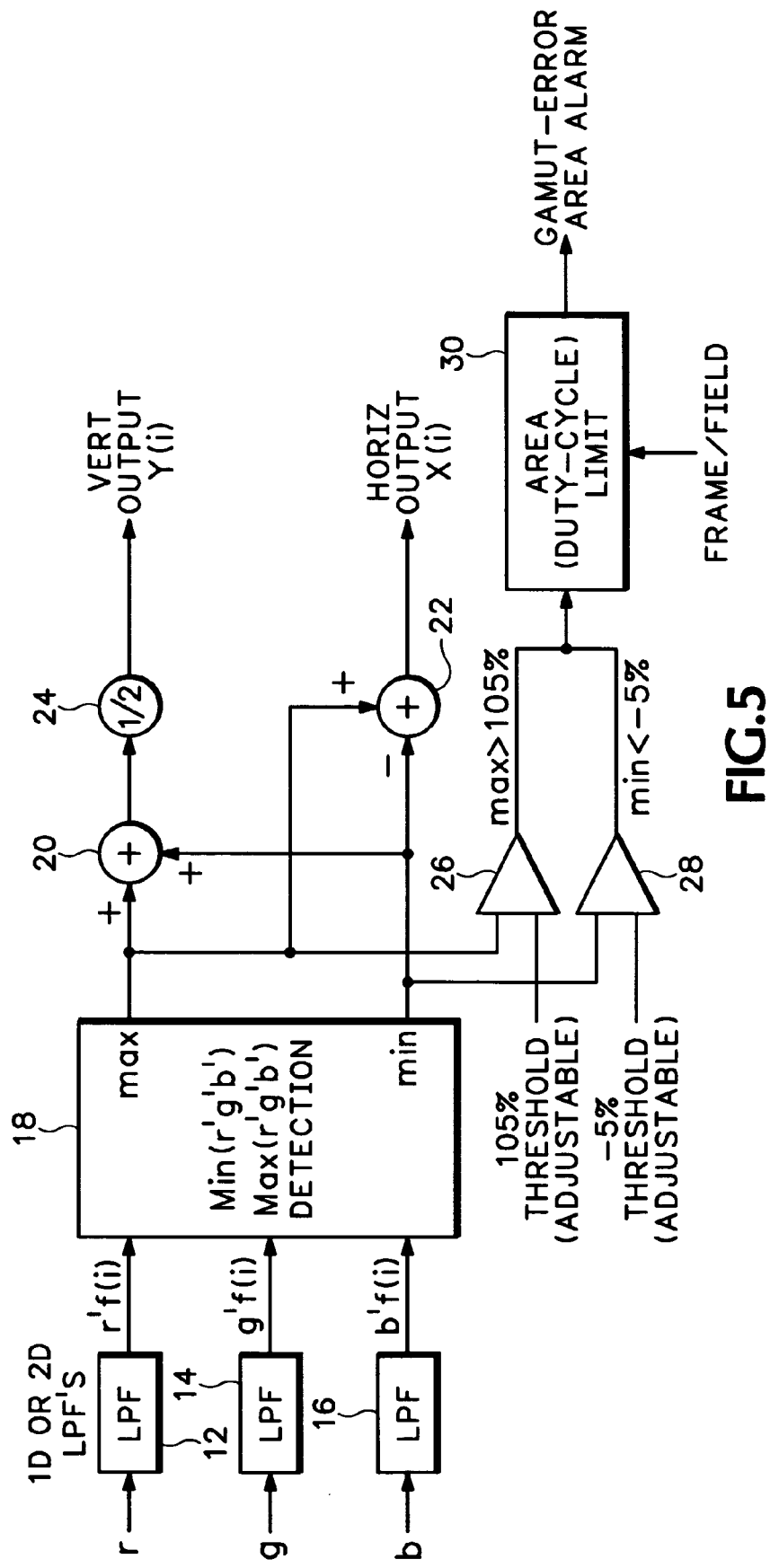
FIG. 5 is a logic block diagram view for determining values for the artistic color gamut space according to the present invention.

For simplicity and by way of example the following description refers to discrete-time or digital signals, but could be implemented in fully analog processing as well. The respective rgb values are input to respective 1D or 2D low pass filters (LPFs) 12, 14, 16, as shown in FIG. 5, and the filtered outputs are input to a Min/Max detector 18. The min/max values from the Min/Max detector 18 are summed and differenced in respective summing circuits 20, 22, with the sum being divided by two in a divider 24, which may be achieved by right shifting by one bit, to produce the Y(i) output and the difference being output to produce the X(i) output. The min/max may also be input to respective comparators 26, 28 to be compared with adjustable thresholds representative of, for example, −5% and 105% alarm limits. The outputs from the comparators 26, 28 are wire-OR'd together to produce a gamut alarm for either positive or negative limit violations. The outputs from the comparators 26, 28 may also be indicated separately without the wire-OR connection for individual positive and negative gamut alarm indications. Further the outputs from the comparators 26, 28 may be input to an area (duty cycle) limit alarm detector 30 to provide a gamut error area alarm.

Figure 7:
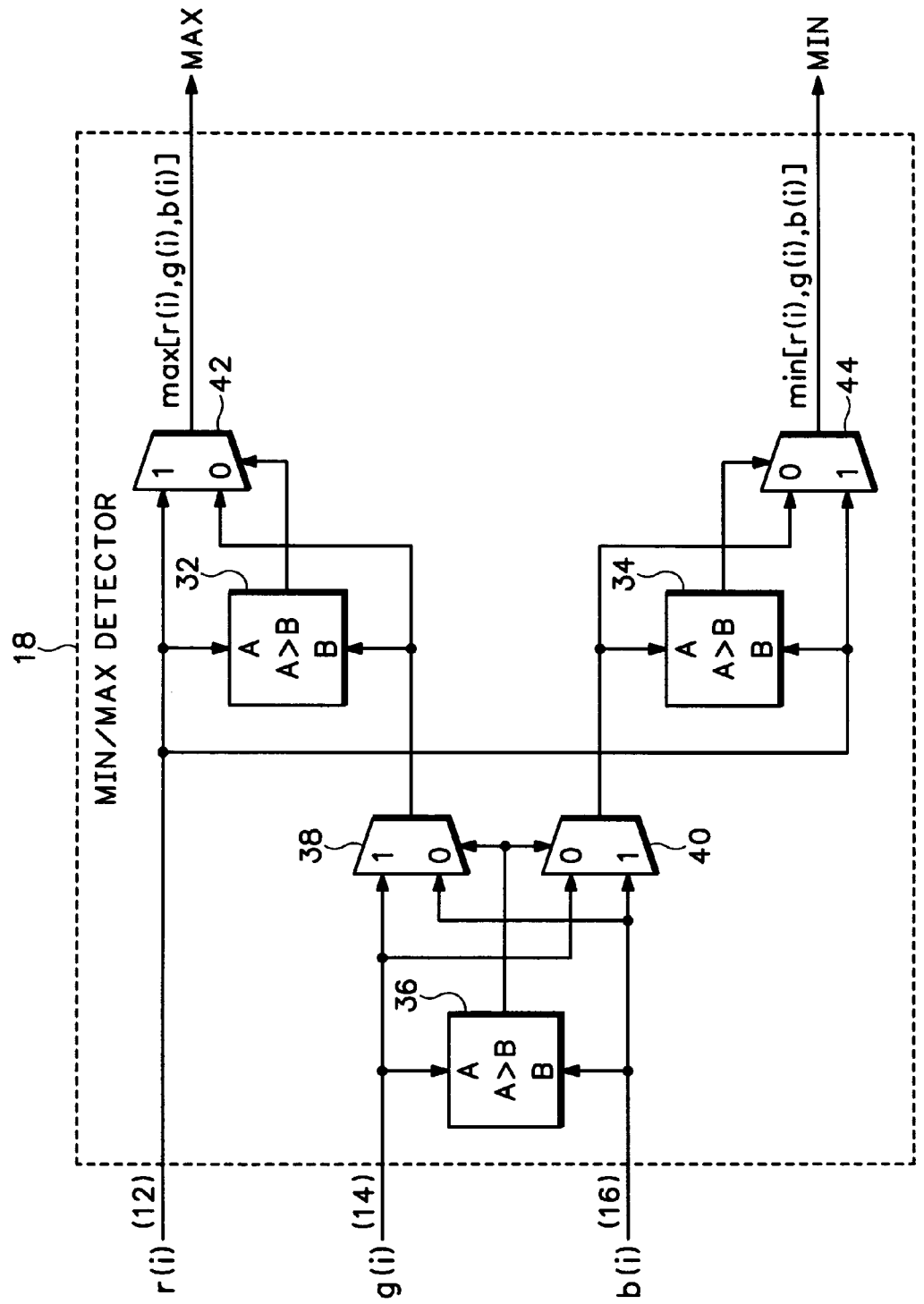
FIG. 7 is a logic block diagram view of an example min/max detector for FIG. 5 according to the present invention.

The Min/Max detector 18 may be implemented as shown in FIG. 7 using digital comparators and multiplexers. For example the r(i) component may be input to respective comparators 32, 34, while the g(i) and b(i) components are input to a third comparator 36 as well as to respective multiplexers 38, 40 controlled by the output from the third comparator. If g(i) is greater than b(i), then g(i) is passed by the first multiplexer 38 to the maximum comparator 32 for comparison with r(i) and b(i) is passed to the minimum comparator 34 for comparison with r(i). If g(i) is not greater than b(i), the opposite signals are passed by the multiplexers 38, 40 to the comparators 32, 34. The maximum comparator 32 controls a maximum multiplexer 42 to pass the maximum of r(i) and the other component input to the maximum comparator as max[r(i),g(i),b(i)]=max(i). The minimum comparator 34 controls a minimum multiplexer 44 to pass the minimum of r(i) and the other component input to the minimum comparator as min[r(i),g(i),b(i)]=min(i).

An example of the lowpass filters 12, 14, 16 is shown in FIG. 8 where the rgb value is first processed by a IEEE Std-205 lowpass filter 46, the output of which is applied both to a switch 48 as a 1D filtered output and to a first line delay 50 and summer 52. The input to the summer 52 is shifted one-bit to perform a divide-by-two and combined with the output from the first line delay 50. The output from the first line delay 50 is also input to a second line delay 54, the output of which is input to a second summer 56 after shifting by one bit to perform a divide-by-two. The other input to the second summer 56 is the output from the first summer 52, with the output from the second summer being applied to the switch 48 as a 2D filtered output. A filter select command determines the position of the switch 48 to produce either a 1D or 2D filtered version of the input component.

Finally the gamut error area limit detector 30 may be implemented as shown in FIG. 9, where the gamut error output from the comparators 26, 28 is input to an accumulator of a summer 58 and a first register 60, the output of the first register being fed back as the other input to the summer. The first register 60 is clocked or updated for each pixel clock pulse and reset by a frame/field start command. The output from the first register 60 also is input to a threshold comparator 62. When the number of gamut errors exceed an area threshold, the comparator 62 provides an output to a second register 64, the output of which is the gamut error area alarm. The second register 64 is clocked or updated for each frame/field start and reset by a reset error command. The threshold is determined by a desired area percentage times the number of pixels per frame/field divided by 100, i.e., Th=(% area)*(number of pixels per line)*(number of active video lines per frame/field)/100. If the number of pixels per frame/field that have a gamut error, as output from the comparators 26, 28 and counted by the accumulator 58, 60, exceeds the area threshold, then on the next frame/field start the comparator 62 provides an output that is entered into the second register 64 to provide the gamut error area alarm.

Figure 6:
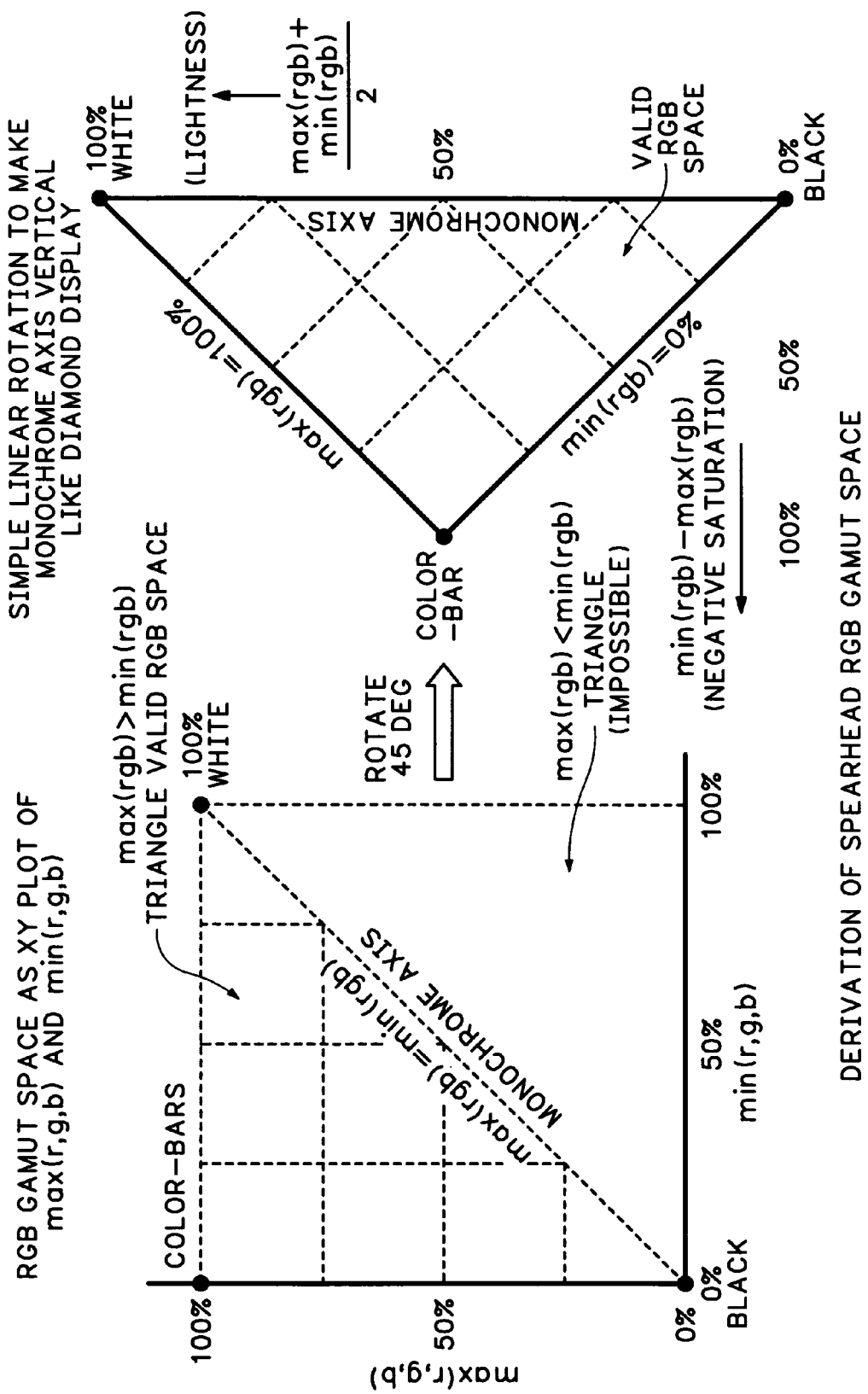
FIG. 6 is a graphical view illustrating the derivation of the artistic color gamut space according to the present invention.

As shown in FIG. 6 an RGB gamut space is an XY plot of max(rgb) and min(rgb). The monochrome axis runs from the origin and divides the XY plot in half. The upper/left half defines valid RGB space of all possible valid or "legal" rgb values where max(RGB)>=min(rgb). In this example this space is a right triangle with the hypotenuse representative of all monochrome signals,and the left side representative of min(rgb) at zero and the top side represetative of max(rgb) at the maximum allowed value. The upper/left half triangle of the XY plot is rotated by 45° to produce the Spearhead display, which is rotated about the monochrome axis by 180° to produce the display of FIG. 4.

The Spearhead display replaces the Diamond display for RGB gamut detection with a simpler triangular space. If, and only if, the rgb pixel value is contained within the triangular area, the gamma corrected rgb is within the RGB cubic color space. As illustrated in FIG. 5, two dimensional or simple horizontal filtering, such as specified in IEEE Standard 205, may be applied to remove transients that are allowed to exceed the gamut triangle. Also area detection may be applied to blank or remove low duty cycle/frame excursions from gamut detection alarms.

Saturation and Value cannot be uniquely determined from the Vector display or any other color metric display. However both the HSV Saturation and Value components of an rgb pixel are uniquely determined from the Spearhead display. For example the color Value may be changed while keeping a fixed Saturation by moving up and down one of the iso-saturation lines in the graticule. Conversely the color Saturation may be changed without changing the color Value by moving along an iso-value graticule line. The color Lightness may be determined from the vertical component of the display by reading the projection on the monochrome axis. Lightness values above 50% are de-saturated colors.

Like the Diamond display it is useful for color signal processing equipment line-up or calibration to validate whether a signal is truly monochrome. The monochrome or zero-saturation axis of the Spearhead display is the left edge of the space. This axis is the gamma corrected rgb projection for monochrome signals so line-up may include linearity testing and gamma camera adjustment without the need for a waveform parade display. Peak limits of the max and min gamma corrected rgb signal limit on a monochrome test signal may be evaluated, i.e., at 0% and 102%.

Figure 10:
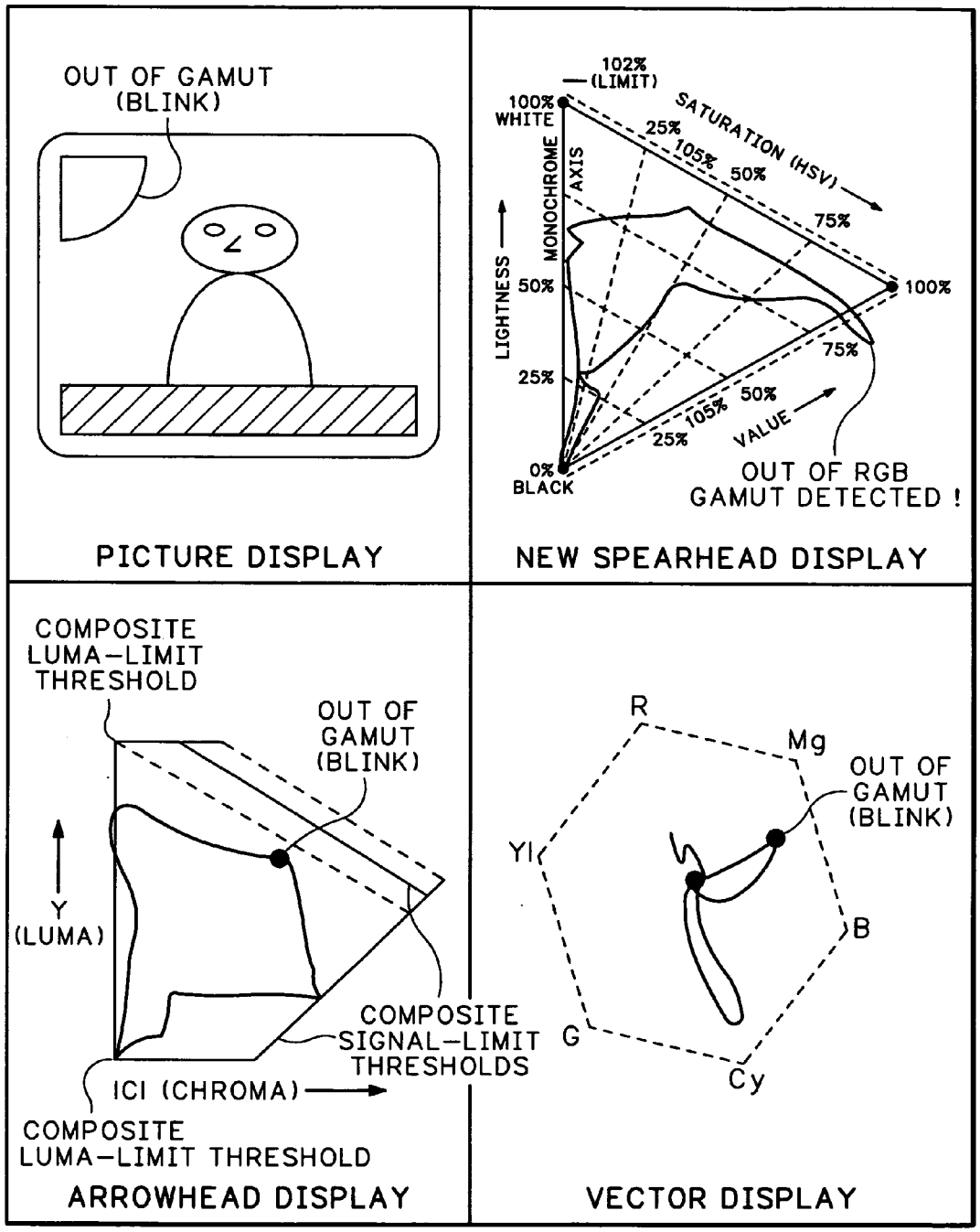
FIG. 10 is a graphical view of a tiled Picture, Vector, Arrowhead and Spearhead display with gamut error markers according to the present invention.

The mapping of an rgb pixel into the Spearhead display is independent, i.e., orthogonal, to Hue. For example the Hue of an rgb pixel may be changed by rotating the pixel value on the Vector while keeping a fixed location on the Spearhead display. By combining the Vector and Spearhead displays as shown in FIG. 10, a complete 3D analysis of the rgb signal in terms of the artistic parameters of Hue, Saturation and Value or Lightness is possible.

By comparing the max rgb to the maximum threshold and the min rgb to the minimum threshold, a Boolean output may be used to trip a gamut alarm. An area/field or frame detect may be done as well to minimize false alarms. This is best done by detecting the Boolean value for any contiguous area, i.e., continuous area>1%, above threshold. By subtracting the 100% limit from the max rgb and the 0% limit from the min rgb, a linear output is created for correcting or limiting the RGB signal values for a legalizer.

Thus the present invention provides an artistic color gamut display in the form of a triangular space that is derived from an XY plot of RGB gamut space, one side being a vertical monochrome axis and the other two sides being projections of Saturation and Value axes.

What is claimed is:

1. An artistic color gamut display comprising a triangular space derived from the XY plot of an RGB gamut space, a first side of the triangular space being a monochrome axis, a second side being a Saturation axis, and a third side being a Value axis.

2. The artistic color gamut display as recited in claim 1 further comprising a graticule superimposed on the triangular space.

3. The artistic color gamut display as recited in claim 2 wherein the graticule includes lines of constant Saturation.

4. The artistic color gamut display as recited in claim 2 wherein the graticule includes lines of constant Value.

5. The artistic color gamut display as recited in claim 2 wherein the graticule includes maximum and minimum color gamut lines.

6. The artistic color gamut display as recited in claim 2 wherein the graticule includes Lightness indicators along the monochrome axis.

7. The artistic color gamut display as recited in claim 2 wherein the graticule includes peak limits for a monochrome test signal.

8. A method of producing an artistic color gamut display comprising the steps of:
   obtaining maximum and minimum values for an RGB signal;
   generating from the maximum and minimum values X and Y values for an XY plot; and
   generating a triangular graticule for the XY plot having a first side representing Lightness, a second side representing Saturation and a third side representing Value, the area within the triangular graticule representing valid color gamut.

9. The method as recited in claim 8 further comprising the step of presenting the artistic color gamut display as one tile on a tiled display where other tiles are selected from the group consisting of an Arrowhead display, a Vector display and a Picture display.

10. The method as recited in claim 9 further comprising the step of flagging an out-of-gamut color indicated by the artistic color gamut display in the other tiles of the tiled display.

11. An apparatus for producing an artistic color gamut display comprising:
    means for obtaining maximum and minimum values for an RGB signal;
    means for generating from the maximum and minimum values X and Y values for an XY plot; and
    means for generating a triangular graticule for the XY plot having a first side representing Lightness, a second side representing Saturation and a third side representing Value, the area within the triangular graticule representing valid color gamut.

12. The apparatus as recited in claim 11 wherein the apparatus further comprises means for presenting a tiled display having the artistic color gamut display as one tile and having other tiles selected from the group consisting of an Arrowhead display, a Vector display and a Picture display.

13. The apparatus as recited in claim 12 wherein the apparatus further comprises means for flagging an out-of-gamut color indicated by the artistic color gamut display in the other tiles of the tiled display.

* * * * *